United States Patent [19]

Brandt

[11] Patent Number: 4,940,316

[45] Date of Patent: Jul. 10, 1990

[54] APPARATUS AND METHOD FOR INCREASING THE EFFICIENCY OF AN ACOUSTO OPTIC DIFFRACTIVE DEVICE

[75] Inventor: Gerald B. Brandt, Edgewood Boro, Pa.

[73] Assignee: Westinghouse Electric Corp., Pittsburgh, Pa.

[21] Appl. No.: 194,064

[22] Filed: May 13, 1988

[51] Int. Cl.$^5$ .............................................. G02F 1/01
[52] U.S. Cl. .................................................... 350/358
[58] Field of Search ............... 350/358, 353, 355, 359, 350/360

[56] References Cited

U.S. PATENT DOCUMENTS

| | | | |
|---|---|---|---|
| 3,730,609 | 5/1973 | Minemura | 350/358 |
| 4,093,976 | 6/1978 | Das | 350/358 X |
| 4,490,845 | 12/1984 | Steinbruegge et al. | 250/339 X |
| 4,575,186 | 3/1986 | Gottlieb et al. | 350/358 |
| 4,622,845 | 11/1986 | Ryan et al. | 73/24 |

FOREIGN PATENT DOCUMENTS 0222813  12/1984  Japan ................................. 350/358

OTHER PUBLICATIONS

"Internal Ultrasonic Light Modulators for Mode Locking" by N. Sekiguchi, Proceedings of 1968 National Convention of the Institute of Electronics and Communication Engineers of Japan, vol. 4, pp. 20-21, 1968.

Bolef et al., "Some Continuous-Wave Techniques for Measurement of Velocity and Attenuation of Ultrasonic Waves Between 1 and 1000 Mc," pp. 19-26, Jul., 1963.

D. I. Bolef et al., "Measurement of Elastic Constants of RbBr, RbI, CsBr, and CsI by an Ultrasonic cw Resonance Technique," J. App. Phys., vol. 31, No. 6, pp. 1010-1017, Jun. 1960.

I. C. Chang, "Tunable Acousto-Optic Filters: An Overview," Optical Engineering, vol. 16, No. 5, pp. 455-460, Sep./Oct. 1977.

K. B. Steinbruegge, "Automated Acousto-Optic Tunable Filter (AOTF) Infrared Analyzer," Proc. of SPIE, vol. 268, pp. 160-166, Feb., 1981.

Primary Examiner—Eugene R. LaRoche
Assistant Examiner—Nathan W. McCutcheon
Attorney, Agent, or Firm—W. G. Sutcliff

[57] ABSTRACT

An acousto optic diffractive device including a transducer for launching acoustic energy into a crystal so as to maximize overlap of the acoustic energy within the crystal, and a light source for illuminating the crystal so that the light is diffracted by the overlapping acoustic energy. By operating an acousto optic diffractive device in resonance, the amount of power required to drive the acousto optic diffractive device is significantly lowered, without adversely affecting the wavelength pass band of the device.

6 Claims, 3 Drawing Sheets

APPARATUS AND METHOD FOR INCREASING THE EFFICIENCY OF AN ACOUSTO OPTIC DIFFRACTIVE DEVICE

Background of the Invention

The present invention relates to an acoustic optic diffractive device, and more particularly to an apparatus and method for increasing the efficiency of an acousto optic tunable filter (hereinafter "AOTF"). AOTFs are used in spectroscopy of gases in order to detect various molecular species. Such a use is well known and described in, for example, Steinbruegge et al., "Automated AOTF Infrared Analyzer," Proceedings of the International Society of Optical Engineering, Vol. 268, Imaging Spectroscopy pp. 160–166, 1981. In order to extend AOTF spectroscopy to the ultraviolet portion of this spectrum, AOTF filters are constructed using single crystal quartz. While quartz is transparent to below 200 nm, and possesses the appropriate symmetry for AOTF operation, it is not as efficient as other materials such as tellurium dioxide. The single crystal quartz AOTFs, therefore, require relatively high RF power, as much as 10 to 50 watts to drive the AOTF efficiently. An alternative means for increasing the efficiency of a single crystal quartz AOTF is to increase the overall interaction length between the light incident to the AOTF and the acoustic waves within the AOTF. However, increasing the overall interaction length decreases the wavelength pass band of the AOTF. As a result, the optical throughput of the AOTF is lowered.

Summary of the Invention

It is an object of the present invention to provide an efficient acoustic optic diffractive device.

It is another object of the present invention to provide an efficient, resonant acousto optic diffractive device.

It is a further object of the present invention to provide a resonant acousto optic tunable filter.

To achieve the above and other objects, the present invention provides an acousto optic diffractive device comprising a crystal, an acoustic means for launching acoustic signals into the crystal so as to maximize overlap of the acoustic signals within the crystal, and means for illuminating the crystal with light so that the light is diffracted by the overlapping of acoustic signals within the crystal.

The present invention also provides a method of operating an acousto optic diffractive device including a crystal. The method includes the steps of launching acoustic signals into a crystal so as to maximize overlap of the acoustic signals within the crystal, and illuminating the crystal with light so that the light is diffracted by the overlapping acoustic signals within the crystal.

Description of the Preferred Embodiments

Figure 1:
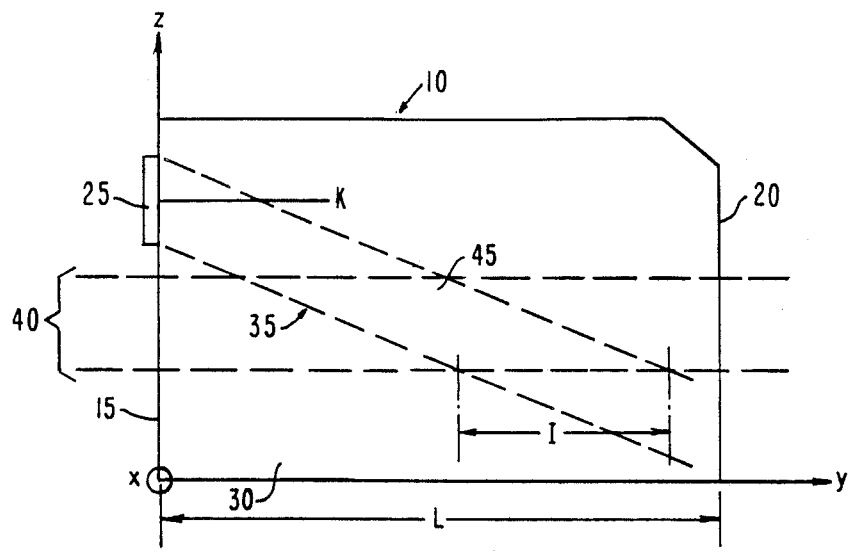
FIG. 1 is a schematic representation of a first embodiment of the present invention.

FIG. 1 is a schematic representation of a first embodiment of the present invention. More particularly, FIG. 1 illustrates a collinear quartz AOTF 10. In FIG. 1, a first side 15 of a crystal 30 is parallel to a second side 20. A transducer 25 is mounted on the first side 15 and launches acoustic signals into the crystal 30. The crystal can comprise, for example, a birefringement material such as $TeO_2$, or quartz. The embodiment schematically illustrated in FIG. 1 employs quartz. The AOTF illustrated in FIG. 1 is designed using the design process discussed in I. C. Chang, "Tunable Acousto-Optic Filters; An Overview," Optical Engineering Vol. 16 No. 5 pp. 455–460 (1977), which is hereby incorporated by reference. As an example, the transducer 25 has a size of $10 \times 15$ mm and the crystal 30 has Z and y dimensions of 4 cm $\times$ 6.4 cm.

In FIG. 1 an acoustic momentum vector, K, is aligned along the Y axis of the crystal 30. Also, the light to be filtered is introduced into the crystal parallel to the Y axis. Since the light direction of propagation and the momentum vector K are parallel, this filter is referred to as a collinear AOTF.

The transducer 25 launches acoustic energy into the crystal with a momentum vector K perpendicular to the transducer face. In an acoustically anisotropic material such as quartz the direction of energy flow is not parallel to the momentum vector but rather, walks off at an angle to the K vector. In quartz, for an acoustic K vector parallel to the Y axis, the walkoff angle is approximately 24 degrees. The direction of propagation of this column of acoustic energy is denoted with reference numeral 35 in FIG. 1.

When the acoustic energy (e.g. wave) reaches the second side 20, the K vector is reflected back along the Y axis because the first side 15 and the second side 20 are parallel. Since the K vector is reversed relative to the crystal axis, the direction of walk-off is in the direction of the positive Z axis. As a result, the acoustic energy retraces the path through column 35 and an acoustic resonance is established between faces 15 and 20.

Figure 3:
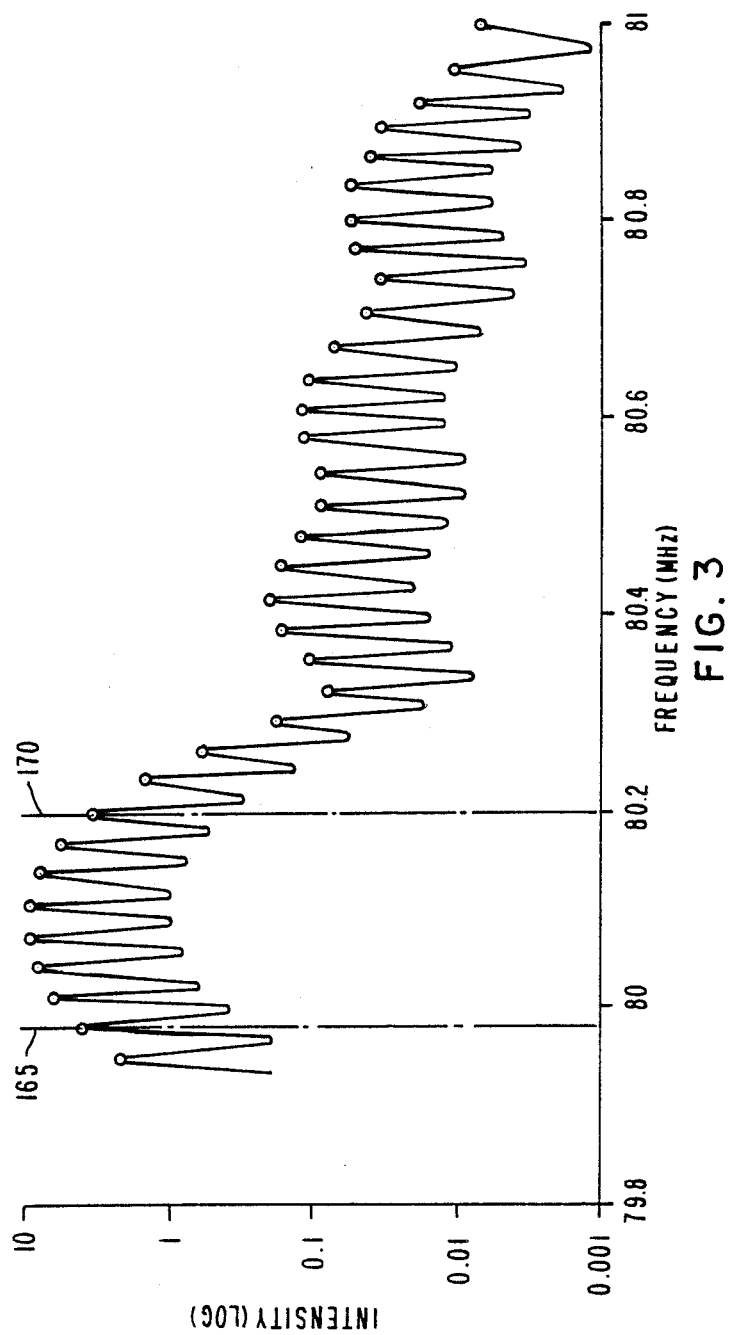
FIG. 3 is a graph illustrating the frequency response of an acousto optic tunable filter embodying the present invention.

The resonance established between faces 15 and 20 is said to produce constructive interference when the acoustic wave which has made a round trip between faces 15 and 20 is in phase with the acoustic signal at the driving transducer 25. This will take place when the frequency of the acoustic wave is such that an integral number of wavelengths fit in the round trip path through the crystal. Ignoring the thickness of the transducer 25, this will take place when $$L/\text{acoustic wavelength} = \text{an integer, N or} \tag{1}$$

$$L * C/F = \text{an integer, N}$$

Where C is the velocity of sound along L and F is the acoustic frequency. At frequencies where equation (1) is satisfied, a standing wave is produced in the crystal. This standing wave has a peak amplitude which is the sum of the amplitudes of the forward and backward waves. The filter response as it varies with frequency is shown in FIG. 3. FIG. 3 is a plot of intensity of a laser line as a filter is swept in frequency, F. Each black point represents a peak filter response at a cavity resonance. Between resonances, the intensity decreases as shown schematically in FIG. 3.

In FIG. 1, an optical aperture 40 identifies a vertical area in which an input beam can enter the AOTF and still have maximum interaction with the resonant acoustic energy within the column 35. The maximum interaction of length I occurs in the parallelopiped region 45.

Figure 2:
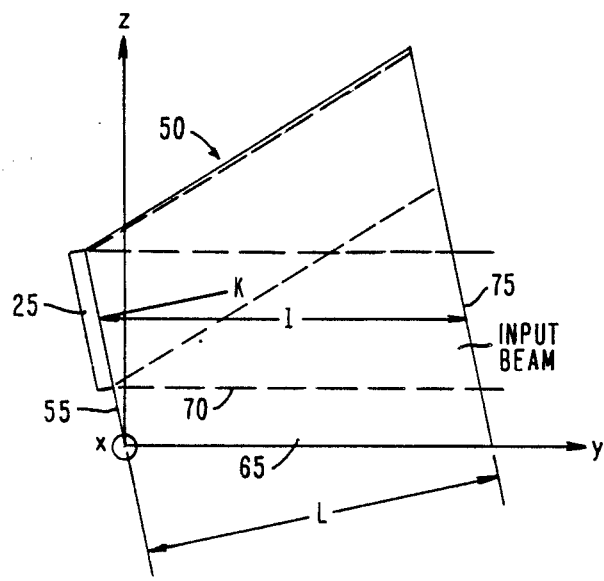
FIG. 2 is a schematic representation of a second embodiment of the present invention.

FIG. 2 is a schematic representation of a second embodiment of the present invention. More particularly, FIG. 2 illustrates a non-collinear resonant AOTF 50 with maximum interaction length. As in the FIG. 1 structure, a first side 55 is parallel to a second side 75.

The transducer 25 launches an acoustic wave (i.e., acoustic energy) into a crystal 65 with a momentum vector K perpendicular to surface 55. In this design, the K vector is tilted −11.2 degrees relative to the Y axis and the optic axis of the crystal is aligned along the Z axis as shown in FIG. 2. As in the case of the collinear AOTF, the acoustic energy is transported at an angle (in this case, 22.4 degrees) from the K vector. When the acoustic energy reaches side 75, it is reflected and the acoustic energy travels back along column 70; thus, forming a resonant cavity of length L where L is the perpendicular distance between sides 55 and 75. Resonances in this cavity are maximum at frequencies at which equation 1 is valid.

In the embodiment shown in FIG. 2, the input optical beam is at an angle of approximately 102 degrees with respect to the optic (Z) axis. As shown, the input beam is coincident with the column 70. However, since the input beam is not parallel to the K vector, the AOTF is termed a non-collinear resonant AOTF. As seen in FIG. 2, the interaction length I between the input beam and the resonant acoustic signals is significantly longer than the interaction length I of the collinear resonant AOTF shown in FIG. 1. When the optical beam reaches the first side 55, it is reflected and exits thru the upper part of the crystal.

Resonant operation of the acousto optic diffractive device of the present invention is contrary to operation of existing devices. For example, the Steinbruegge et al. reference teaches that when operating AOTFs certain annoying effects occur that are possibly due to resonances within an AOTF. The inventor of the subject application has confirmed that resonances within an AOTF can actually occur. In fact, the present invention maximizes the resonances by assuring that there is maximum overlap of acoustic signals launched into and reflected within the crystal. To achieve maximum overlapping of acoustic signals, the present invention can launch acoustic pulse signals into a crystal, provided that the length of the pulse signals is sufficient that an acoustic pulse signal (energy) returns to the transducer at least once prior to the termination of the pulse. In addition, the acoustic signals can vary from such a pulse signal to continuous wave (CW) operation. Such operation is contrary to existing AOTFs which operate with very short pulses. That is, they operate with pulses having a duration of less than the time that it would take the pulse to travel halfway across the crystal. Short pulse operation minimizes the possibility of any unwanted resonances occurring in an AOTF.

By operating an AOTF in resonance, the intensity of the diffracted light is significantly increased over non-resonant operation of an AOTF with the same acoustic power applied to the AOTF. Experiments have shown that the intensity of the diffracted optical signal is increased by approximately 2 to 30 times over that of a non-resonant AOTF. This is significant because typically diffraction efficiency has been increased by increasing either the drive power or the interaction length between the acoustic signal and the input beam. The latter approach, however, decreases the wavelength pass band of an AOTF, and thus decreases the optical thruput for broad band spectra. Resonant operation, which heretofore has been considered a drawback to be avoided, provides significant increases in diffraction efficiency of an AOTF, without changing the wavelength pass band of the AOTF. In other words, by applying the present invention to an AOTF it is not necessary to increase either the drive power or the interaction length of the AOTF in order to increase its diffraction efficiency.

Figure 4:
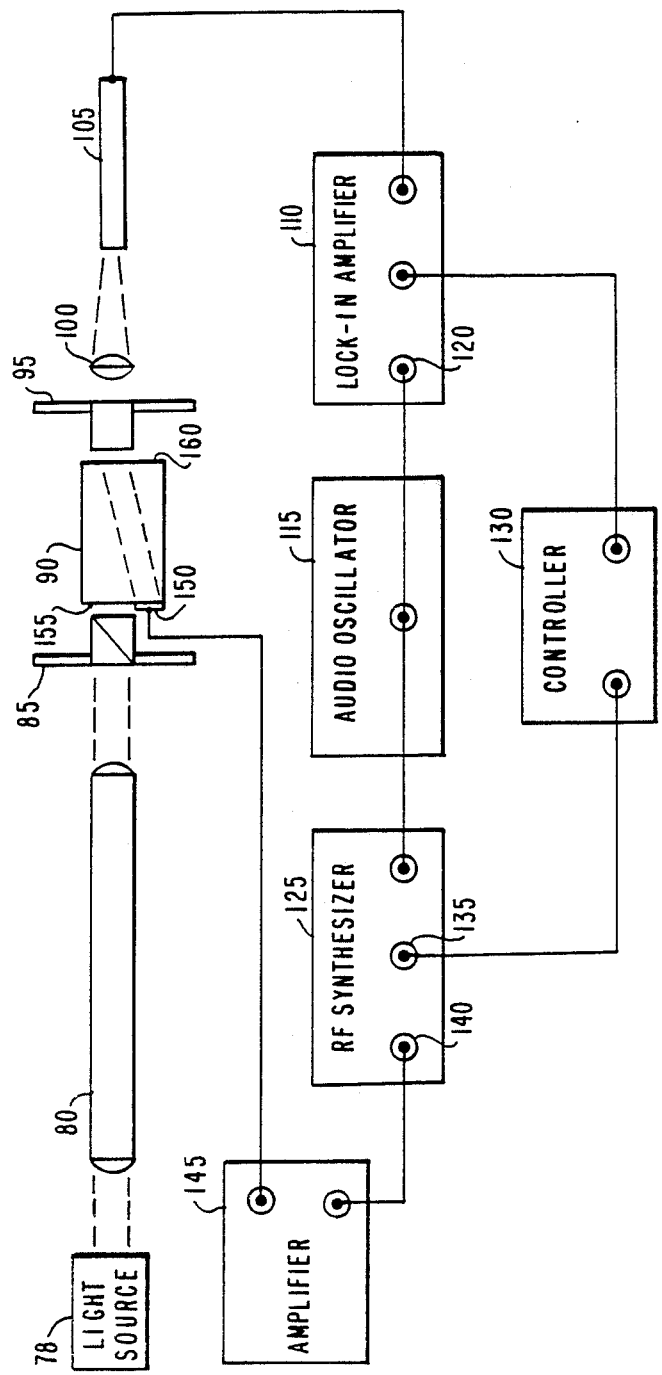
FIG. 4 is a block diagram of an application employing the present invention.

FIG. 4 illustrates a system which utilizes a resonant AOTF to perform spectroscopy on a gas according to the present invention. Referring to FIG. 4, a light source such as an ultraviolet deuterium lamp illuminates a gas cell 80. The light passes through a first polarizer 85, a quartz AOTF 90 having a structure similar to that illustrated in FIG. 1, and then through a second polarizer 95.

A lens 100 can be used to focus the light exiting the second polarizer 95. A photomultiplier 105 detects the light and applies a signal varying in accordance with the detected light to a lock-in amplifier 110. The lock-in amplifier 110 is driven by an audio oscillator 115 to detect light having a amplitude varying in accordance with a reference signal which is applied to a reference input 120 of the lock-in amplifier 110. The audio oscillator 115 also drives an RF synthesizer 125. The output frequency signal of the audio oscillator 115 modulates either the amplitude or frequency of an RF signal selected by controller 130 by way of input 135 of the RF synthesizer 125. In other words, the modulated output of the RF synthesizer 125 supplied at output terminal 140 is AM or FM modulated about the frequency set by the controller 130. A broadband amplifier 145 amplifies the output signal from the RF synthesizer 125 and drives a transducer 150 of the quartz AOTF 90.

As noted above in equation (1), at a frequency F, a first side 155 of the quartz AOTF 90 is spaced from a second side 160 of the AOTF 90 by a distance corresponding to an integral number of wavelengths of the acoustic signal generated by the transducer 150. Therefore, if the proper frequency is selected by the controller 130 and applied to the transducer 150, then resonance will occur in the AOTF 90. If the signal applied to the transducer 150 is amplitude modulated, the desired signals passing through the AOTF will also be amplitude modulated. Since a lock in amplifier detects only signals in phase with its reference signal, only the portion of the signal from the photomultiplier corresponding to filtered light will be detected. However, if the signal applied to the transducer 150 is FM modulated, then the AOTF 90 will move in and out of resonance at a frequency determined by the audio oscillator 115. The lock-in amplifier will also only output signals, detected by the photomultiplier 105, that vary with a frequency determined by the audio oscillator 115. As the controller 130 varies the frequency applied to the RF synthesizer 125, the AOTF 90 will be driven in and out of resonance depending upon the wavelength of the signal applied to the transducer 150 (regardless of any modulation of the RF signal). This is seen in the response curve shown in FIG. 3 which was obtained with an apparatus similar to that shown in FIG. 4 with the difference that the light source was replaced by an argon laser operating at 457.9nm. Since the argon laser output is very narrow in wavelength range about its center wavelength, the response to this illumination maps the characteristic response of the filter. The envelope of the curve shown in FIG. 3 follows the well known characteristic an AOTF; that is, it has the $(\sin x/x)^2$ waveform. The peaks represented by the dots in FIG. 3 occur at resonant frequencies of the AOTF 90. The resolution of the filter is the width at half height of the large lobe denoted between the lines 165 and 170. An AOTF, according to the present invention, has approximately 7 points of resonance within the resolution of the filter. The present invention, therefore, does not limit the resolution of an AOTF. In other words, the AOTF cannot be used to make measurements more significant than the width of the largest lobe, and there are sufficient acoustic resonances within the lobe so that the resolution of the filter is not compromised.

The spacing between the resonance points illustrated in FIG. 3 can be adjusted by varying the length of the crystal (e.g., FIG. 1, reference numeral 30). The losses of the crystal, in part, determine the sharpness of the resonances. For example, if the length of the crystal is shorter, then the resonances are further apart. However, because the length is shorter, then losses in the crystal are lower. The acoustic signal may make more round trips and therefore the resonances are sharper.

Software in the controller 130 shown in FIG. 4 can be used to detect the frequency difference between two resonances in the AOTF 90. If resonances are found at two neighboring frequencies $F_1$ and $F_2$ such that N changes by 1 in equation (1), then the relation $$L * C/1 = F_1 - F_2 \tag{2}$$

can be used to determine the velocity C to form the difference in frequencies. A refined analysis of this calculation is described in Bolef et al. "Some Continuous-Wave Techniques for the Measurement of Velocity and Attenuation of Ultrasonic Waves between 1 and 1,000 Mc," IEEE Trans. on Ultrasonics Engineering, pp. 19–26 July 1963 which is hereby incorporated by reference. Since the velocity of sound in quartz is a function of temperature, the temperature of the quartz AOTF can therefore be determined. This information can be used to vary the frequency applied by the RF synthesizer 125 so as to maintain resonance in the quartz AOTF 90 regardless of temperature variations. Employing this technique permits the quartz AOTF to be operated without the need for expensive constant temperature mechanisms.

In short, I have discovered that diffraction responses in an acousto optic diffractive device such as an AOTF, can actually be enhanced by operating with long pulses (having a duration of approximately 10 times the time that it takes a pulse to make a round trip in a crystal). By operating an AOTF with long pulses or continuous wave operation, I have observed 2 to 30 times improvement in the diffraction response of an AOTF, compared with the response obtained by a single short pulse with the same RF power. The improvement in diffraction response enables an AOTF to be operated with significantly less power, while providing the same diffraction response.

While the present invention has been described with respect to specific examples, these examples are not intended to limit the present invention, which instead is defined by the following claims.

What is claimed is:

1. An acousto optic tunable filter system comprising:
   a crystal;
   acoustic means for launching acoustic energy into said crystal so as to maximize overlap of said acoustic energy within said crystal;
   means for modulating the acoustic energy launched into said crystal in accordance with a reference signal;
   means for illuminating said crystal with light so that the light is diffracted by said overlapping acoustic energy; means for providing said reference signal; and
   means for detecting light exiting said crystal being in phase with said reference signal.

2. An acousto optic tunable filter system according to claim 1, wherein said crystal has two parallel sides.

3. An acousto optic tunable filter system according to claim 2, wherein said acoustic energy has a wavelength, and said two sides are spaced apart by an integral number of said wavelength.

4. An acousto optic tunable filter system according to claim 1, wherein said crystal comprises an anisotropic material.

5. An acoustic optic tunable filter system according to claim 1, wherein said means for modulating includes frequency modulating means for frequency modulating said acoustic energy.

6. An acousto optic tunable filter system according to claim 1, wherein said means for modulating includes a means for amplitude modulating said acoustic energy launched into said crystal.

* * * * *